(12) United States Patent
Sato et al.

(10) Patent No.: US 6,592,229 B2
(45) Date of Patent: Jul. 15, 2003

(54) EXTERIOR REARVIEW MIRROR

(75) Inventors: Hidenori Sato, Shizuoka (JP);
Mitsuyoshi Nagao, Shizuoka (JP);
Noriyuki Unno, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 10/171,594

(22) Filed: Jun. 17, 2002

(65) Prior Publication Data

US 2003/0011887 A1 Jan. 16, 2003

(30) Foreign Application Priority Data

Jul. 11, 2001 (JP) .......................................... 2001-211167

(51) Int. Cl.[7] ................................................ G02B 5/08
(52) U.S. Cl. ........................ 359/608; 359/601; 359/603; 359/604
(58) Field of Search ................................ 359/608, 601, 359/603, 604, 265, 267, 272, 273, 275, 268, 274

(56) References Cited

U.S. PATENT DOCUMENTS

| | | | | |
|---|---|---|---|---|
| 5,253,109 A | * | 10/1993 | O'Farrell et al. | ............ 359/604 |
| 5,469,296 A | * | 11/1995 | Ohno et al. | .................. 359/603 |
| 5,691,849 A | * | 11/1997 | Ledroit et al. | ............... 359/603 |
| 6,111,684 A | * | 8/2000 | Forgette et al. | .............. 359/267 |
| 6,210,008 B1 | * | 4/2001 | Hoekstra et al. | ............. 359/603 |
| 6,304,363 B1 | * | 10/2001 | Lynam | ......................... 359/275 |
| 6,406,152 B1 | * | 6/2002 | Hoekstra et al. | ............. 359/603 |

\* cited by examiner

*Primary Examiner*—Mohammad Sikder
(74) *Attorney, Agent, or Firm*—Oblon, Spivak, McClelland, Maier & Neustadt, P.C.

(57) ABSTRACT

A mirror assembly 3 is detachably attached to an open side 2a of a mirror housing 2 in an exterior rearview mirror system (exterior mirror) 1 that is mounted outside a vehicle body. A mirror 4 in the mirror assembly 3 is comprised of a transparent glass plate 5 with a reflective coating 6 spread over a back surface of the transparent glass plate 5, through which reflective coating 6 electric current passes to produce an antiglare effect. The electric current passing through the reflective coating 6 is controlled using a sensors 8, 9 that detect intensity of light from surroundings and rearward of the vehicle body, and an electronic control circuit 10 that compares intensity of light detected in each sensor 8, 9 to automatically adjust an antiglare level of reflection in the reflective coating 6. A battery 11 that is connected with the electronic control circuit 10 and supplies electric current into the reflective coating 6 is provided in the mirror housing 2.

6 Claims, 5 Drawing Sheets

EXTERIOR REARVIEW MIRROR

BACKGROUND OF THE INVENTION

This invention relates to an electrochromic (hereinafter referred to as "EC") antiglare exterior rearview mirror that is mounted for example on a side panel or door of automobiles or other vehicles.

In general, an EC antiglare mirror takes the form of an assembly including a panel (support plate) and a mirror mounted on the panel, and the mirror is formed of a transparent glass plate and a reflective coating spread over a back surface of the transparent glass plate to form a reflective surface of the mirror. The EC antiglare mirror assembly is capable of varying reflectance of the reflective surface from a normal condition of total internal reflection (with antiglare effects disabled) in response to an electric charge given to the reflective coating, and thus enabling antiglare effects to show up.

A conventional exterior rearview mirror system (hereinafter referred to as "exterior mirror") comprised of such an EC antiglare mirror assembly is typically mounted on the outside of a vehicle body A, as shown in FIG. 7. For example, in FIG. 7, an exterior mirror 1 such as a door mirror, side mirror and the like is controlled to have an appropriate level of charge applied in such a manner as to coordinate with an interior rearview mirror system (or "interior mirror") M that is comprised of an EC antiglare mirror assembly mounted on an upper portion of the windshield inside the vehicle body A.

The control of charge applied to the reflective coating in the above EC antiglare mirror assembly is, to be more specific, carried out using sensors that are provided in the vehicle body A to detect intensity of light from the surroundings or rearward, which intensity of light detected by each sensor is compared in an electronic control circuit, so that an automatic adjustment is made in antiglare levels. The electronic control circuit and other components are also provided in the vehicle body A where the interior mirror M is mounted, and a battery is installed in the vehicle body A and is used as a power supply for controlling electric charge to produce proper antiglare effects of the exterior mirror 1.

A conventional antiglare effect control system as described above is configured to switch the interior mirror M from a condition of total internal reflection (i.e., non-antiglare condition) to an antiglare condition, in cases where intensity of light detected by each sensor provided inside where the interior mirror M is mounted is much higher than ambient light, especially in night driving when light from rearward by a succeeding car or the like is intense, so as to dazzle a driver.

However, in the above-described conventional antiglare effect control system, no sensor that individually detects intensity of light from surroundings and rearward is provided outside where the exterior mirror 1 is mounted. Thus, as shown in FIG. 8, for example, when light-shielding film F is stuck on rear-panel glass of the vehicle body A, the detected intensity of light incident from the rear of the vehicle body A through the light-shielding film F into the interior mirror M is reduced to a level lower than an actual level of intensity of light. Accordingly, electric charge applied in the exterior mirror 1 would disadvantageously be controlled to produce antiglare effects that could be preferable only for the interior mirror M, so that desirable antiglare effects might not be achieved for a driver, et al.

Moreover, the use of a battery installed in the vehicle body A as a power supply for controlling electric charge to produce antiglare effects in the exterior mirror 1 not only requires burdensome wiring from the battery to the exterior mirror 1, but also aggravates the difficulties of replacement upon breakdown or damages, or of new installation for replacing an existing mirror system with the instant exterior mirror 1. Further, a mirror housing of the existing mirror system has no space necessary for mounting each sensor, and thus the mirror housing itself needs redesigning and reworking when the instant exterior mirror 1 is adopted; consequently extra costs may be incurred.

Recently, automobiles provided with a privacy enhanced screen glass window have been increasing in number. Such a privacy enhanced screen glass window installed automobile need not include an interior mirror system having an antiglare function because the privacy enhanced screen glass window may help reduce glare of light from rearward by a succeeding car or the like so that the light reflected off the interior mirror and getting to the eyes of the driver, et al. is not so intense as to dazzle the driver, et al. In contrast, light reflected off the exterior mirror directly enters the eyes of the driver, et al. through a side window of the vehicle body, and thus more likely dazzles the driver, et al. Accordingly, the privacy enhanced screen glass window installed automobile need include the exterior mirror system having an antiglare function.

SUMMARY OF THE INVENTION

The present invention has been made with consideration given to the above-discussed circumstances, and it is an exemplified object of the present invention to provide an exterior rearview mirror that has an independent antiglare function according to the intensity of light from surroundings and rearward to constantly produce optimum antiglare effects for a driver, et al., while facilitating replacement upon breakdown or damages of an existing exterior mirror system, and new installation for replacing an existing mirror system with the instant exterior mirror system.

In order to achieve the above object, there is provided, according to one aspect of the present invention as set forth in claim 1, an exterior rearview mirror system mounted on an outside of a vehicle body, comprising a mirror housing and a mirror assembly that is detachably attached to an open side of the mirror housing, forming a reflective surface of the mirror system. In this mirror system, the mirror assembly is composed of a mirror and a support plate for supporting the mirror, which mirror is made up of a transparent glass plate with a reflective coating spread over a back surface of the transparent glass plate, through which reflective coating electric current passes to produce an antiglare effect. In addition, the mirror housing contains a first sensor that detects intensity of light from surroundings of the vehicle body, a second sensor that detects intensity of light from rearward of the vehicle body, an electronic control circuit that compares the intensity of light detected by the first and second sensors, thereby controlling the electric current in the reflective coating so as to automatically adjust an antiglare level, and a battery that is connected with the electronic control circuit to supply the electric current into the reflective coating.

This construction provides an exterior mirror comprehensively incorporating all functions of detecting light from surroundings and rearward of a vehicle body, achieving an antiglare effect, and supplying electric current. Thus, independent control of electric current to appropriately adjust antiglare levels without coordinating with the EC antiglare interior mirror as a conventional antiglare effect control system requires becomes possible, and a complicate task for wiring from a battery provided in the vehicle body may be dispensed with. Moreover, provision of a dedicated battery allows electric current to be optimized so as to produce an optimum antiglare effect. Further, an antiglare level of the interior mirror never affects an antiglare effect control in the exterior mirror, and thus an optimum antiglare effect may be constantly achieved even if light-shielding film is stuck on rear-window glass of the vehicle body, or a privacy enhanced screen glass window is installed in the vehicle body.

According to another aspect of the present invention as set forth in claim 2, the mirror assembly in the above exterior rearview mirror system as set forth in claim 1 may have a modular structure in which the first and second sensors, the electronic control circuit, and the battery are combined into one unit.

This construction serves to easily achieve tasks of replacing an existing non-antiglare mirror system with an antiglare mirror system, or replacing the mirror system upon breakdown or damages, only by replacing the mirror assembly mounted in the mirror housing. Moreover, this construction, which never requires working the mirror housing, serves to reduce costs.

According to yet another aspect of the present invention as set forth in claim 3, the mirror assembly in the above exterior rearview mirror system as set forth in claim 1 may have an aperture formed in part of the reflective coating so that the first and second sensors provided adjacent to each other on the support plate face the transparent glass plate through the aperture, and a light-shielding cover that intercepts only light from rearward of the vehicle body may be provided on a front surface of the mirror right opposite to the first sensor.

This construction may serve to exclude an influence of light from rearward of the vehicle body, and thus especially allows the first sensor to detect intensity of light from surroundings of the vehicle body with high accuracy and real precision.

According to yet another aspect of the present invention as set forth in claim 4, a light-shielding plate may be interposed between the first sensor and the second sensor in the above exterior rearview mirror system as set forth in claim 3.

This construction may serve to eliminate interference between light from surroundings and light from rearward of the vehicle body, and thus allows the first and second sensors to detect intensity of light with high accuracy and real precision.

According to yet another aspect of the present invention as set forth in claim 5, the first and second sensors in the above exterior rearview mirror system as set forth in claim 1 may be so provided that the first sensor faces a frame of the mirror housing except the open side thereof, while the second sensor faces the open side of the mirror housing.

This construction allows detection of intensity of light from surroundings and rearward of the vehicle body to occur with great efficiency and high accuracy.

According to yet another aspect of the present invention as set forth in claim 6, the first and second sensors in the above exterior rearview mirror system as set forth in claim 1 may be so provided that the first sensor face a frame of the mirror housing except the open side thereof, while the second sensor is located on the support plate of the mirror assembly so that the second sensor faces the transparent glass plate through an aperture formed in part of the reflective coating.

This construction also allows detection of intensity of light from surroundings and rearward of the vehicle body to occur with great efficiency and high accuracy.

Other objects and further features of the present invention will become readily apparent from the following description of preferred embodiments with reference to accompanying drawings.

DETAILED DESCRIPTION OF THE PREFERRED EMBODIMENTS

A description will be given of preferred embodiments of the present invention with reference to FIGS. 1 through 6.

Figure 1:
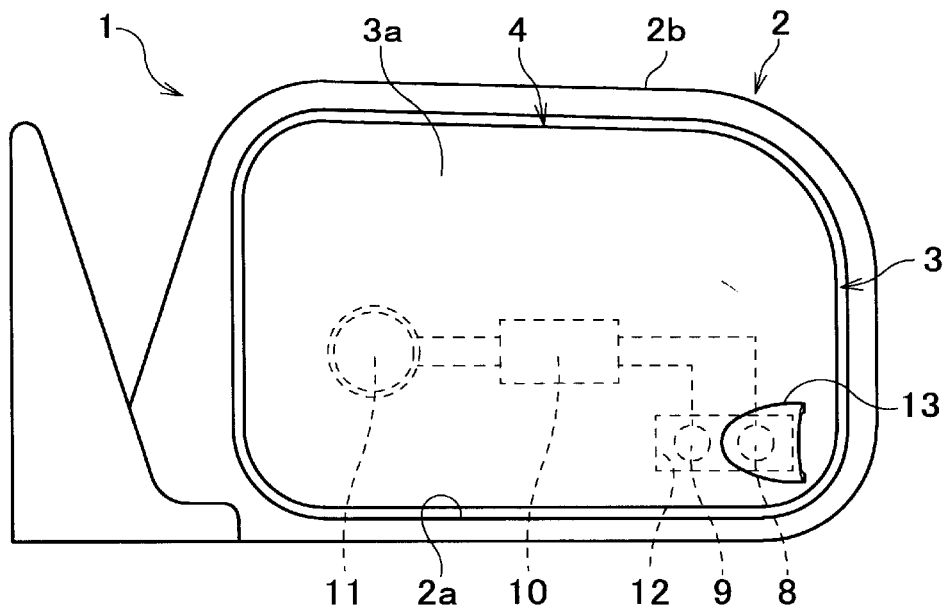
FIG. 1 is an elevation showing a first embodiment of an exterior rearview mirror according to the present invention.
Figure 2:
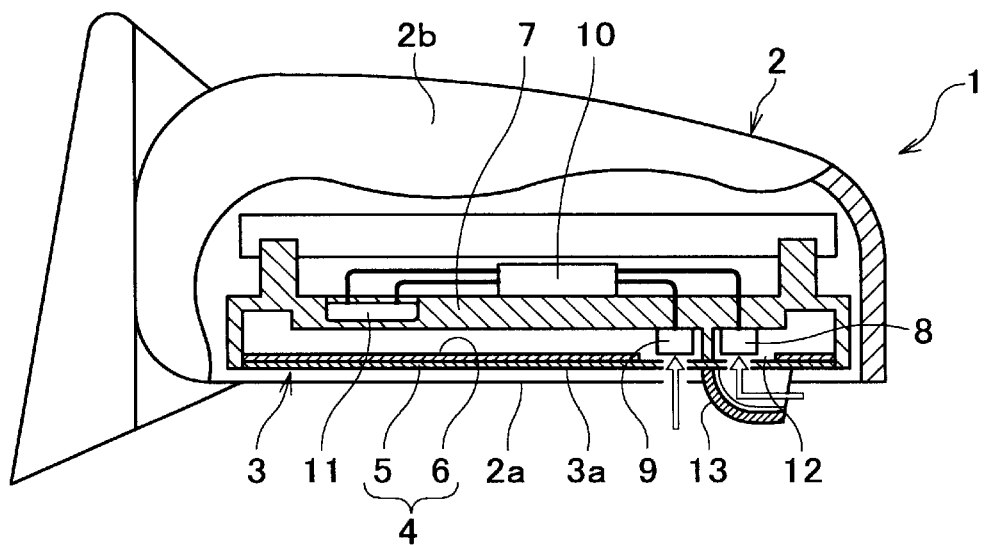
FIG. 2 is a plan view of the exterior rearview mirror as shown in FIG. 1 with a mirror housing partially cutaway.
Figure 3:
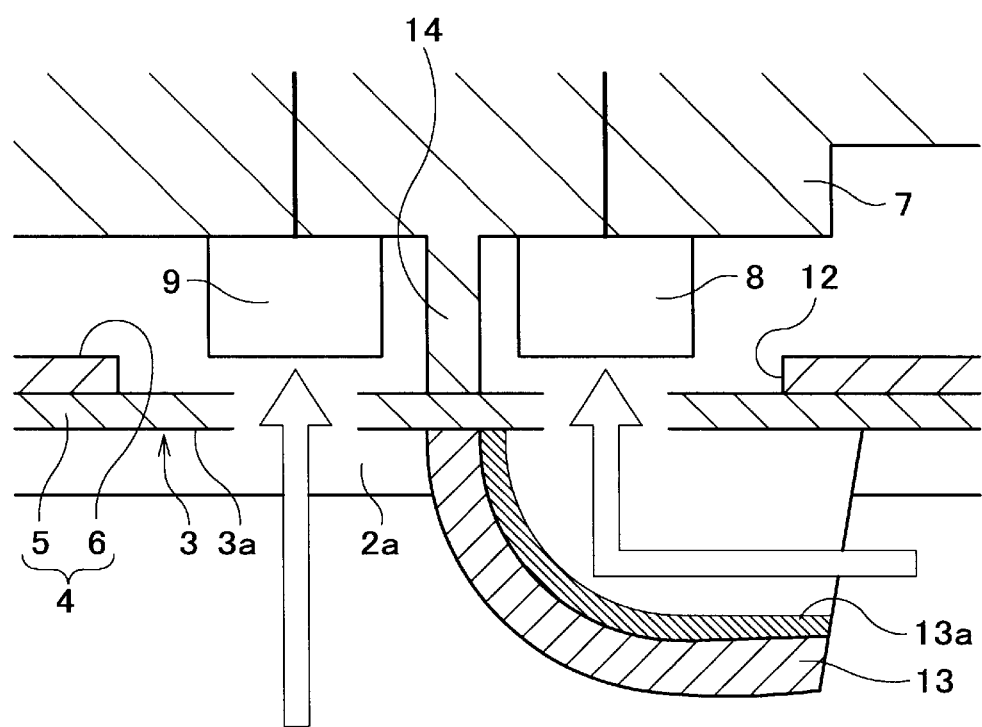
FIG. 3 is an enlarged horizontal section of a principal portion of a sensor in the exterior rearview mirror as shown in FIG. 1.
Figure 4:
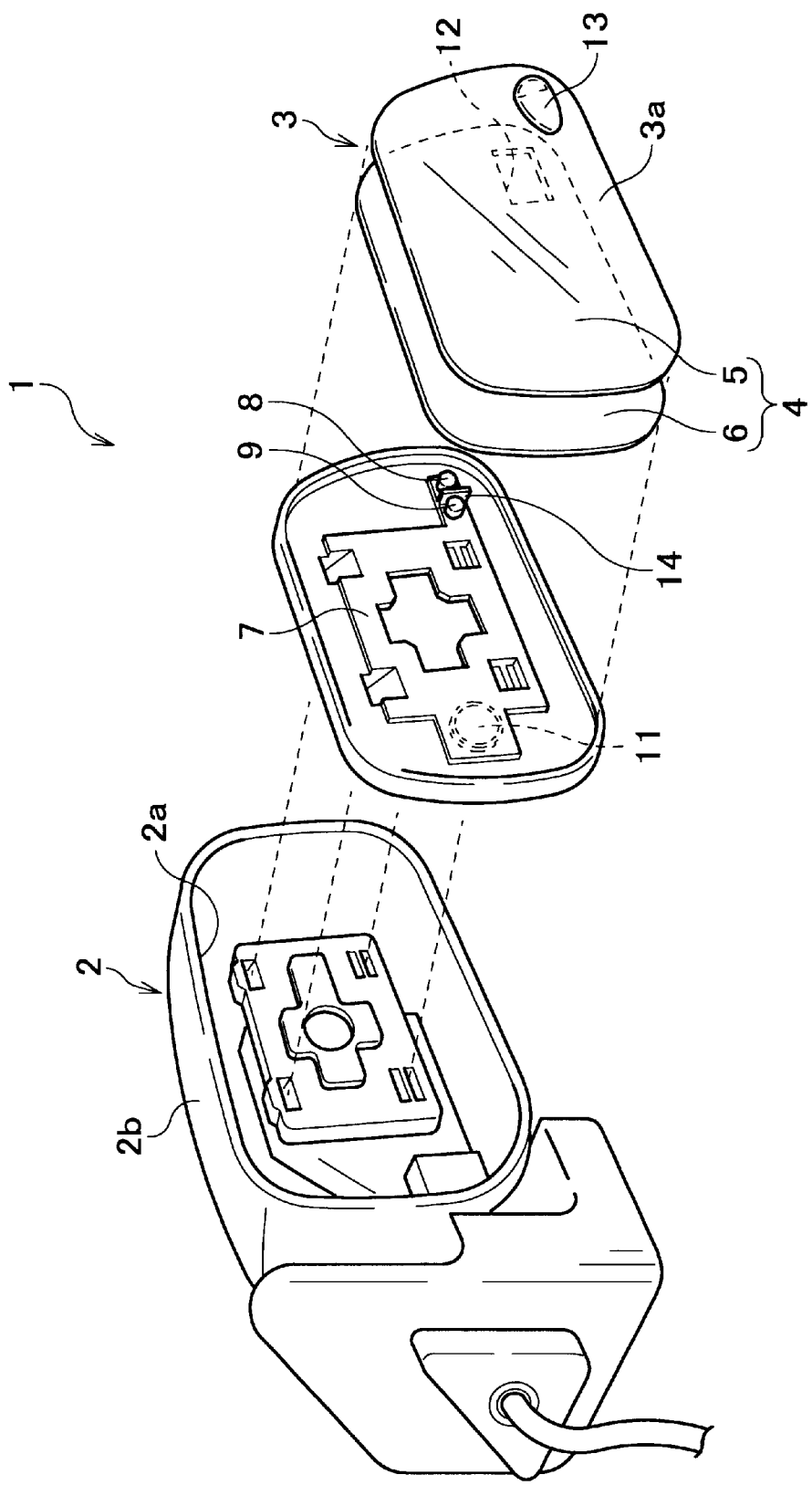
FIG. 4 is an exploded perspective view showing a whole structure of the exterior rearview mirror as shown in FIG. 1.

FIGS. 1 through 6 depict a first embodiment of an exterior rearview mirror according to the present invention: FIG. 1 is a front view; FIG. 2 is a plan view illustrated with a mirror housing partially cutaway; FIG. 3 is a magnified horizontal section of a principal part of a sensor; and FIG. 4 is an exploded perspective view.

As shown in FIGS. 1 through 4, an exterior rearview mirror system (hereinafter referred to as "exterior mirror") 1 includes a mirror housing 2, and a mirror assembly 3 detachably attached to an open side 2a of the mirror housing 2, which open side 2a is front-located on a vehicle body and faces rearward so that a driver may look behind through the mirror. The mirror assembly 3 includes a mirror 4, which is composed of a transparent glass plate 5 and a reflective coating 6 spread over a substantially whole surface at the back of the transparent glass plate 5, and a support plate 7 supporting the back of the transparent glass plate 5.

The reflective coating 6 that forms the mirror 4 is controlled to vary reflectance of the reflective surface 3a in the mirror assembly 3 in response to an electric charge given to the reflective coating 6. This switches the reflective surface 3a in the mirror assembly 3 from a condition of total internal reflection (or non-antiglare condition) to an antiglare condition, and thus enabling EC antiglare effects to show up.

The mirror assembly 3 has a modular structure in which components of an antiglare control mechanism are assembled into one unit, which components include: a first sensor 8 that detects intensity of light from surroundings of the vehicle body; a second sensor 9 that detects intensity of light from rearward of the vehicle body; an electronic control circuit 10 that compares the intensity of light detected by the first and second sensors 8, 9, thereby controlling an electric current in the reflective coating 6 so as to automatically adjust an antiglare level; and a battery 11 that is connected with the electronic control circuit 10 to supply the electric current into the reflective coating 6.

In such an antiglare control mechanism of the exterior mirror 1, an aperture 12 is formed in the reflective coating 6, for example, by cutting out or notching a part thereof corresponding to one lower corner of the mirror 4 so that the first and second sensors 8, 9 provided adjacent to each other on the support plate 7 face the transparent glass plate 5 through the aperture 12. In addition, a hood-shaped light-shielding cover 13 is provided on a front surface of the mirror 4, i.e., transparent glass plate 5, right opposite to the first sensor 8. The light-shielding cover 13 is configured to intercept light from rearward of the vehicle body so as not to permit the light to enter the first sensor 8, and to permit light from surroundings of the vehicle body to enter the first sensor 8 by the reflection of an reflective surface 13a formed inside the light-shielding cover 13. Moreover, a light-shielding plate 14 is provided between the first sensor 8 and the second sensor 9 to prevent interference between light from surroundings of the vehicle body and light from rearward of the vehicle body.

Figure 7:
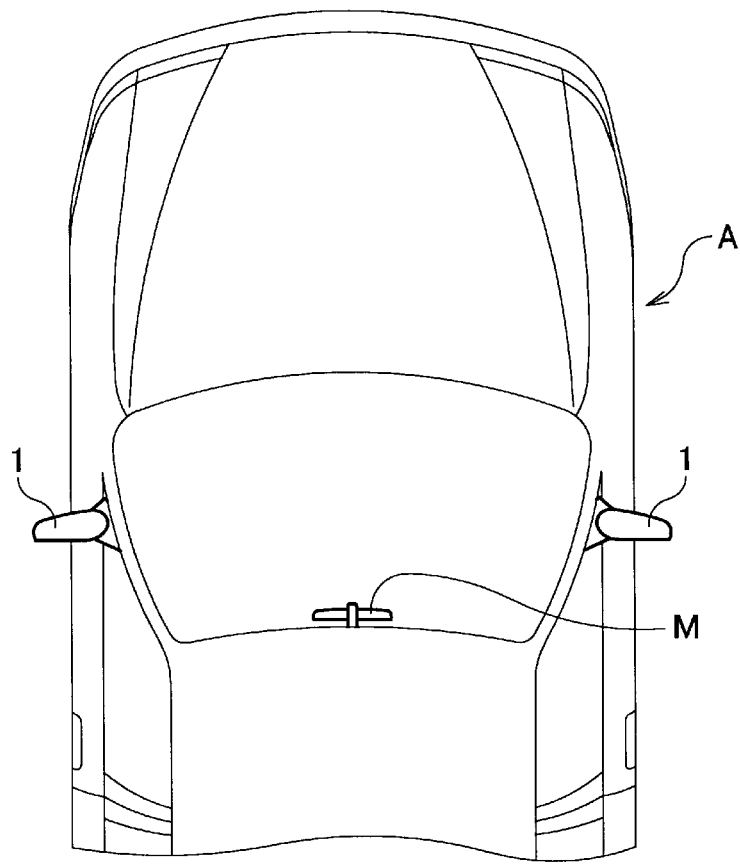
FIG. 7 is a plan view of a front half of a vehicle body for schematically illustrating a conventional antiglare control system in an interior rearview mirror and an exterior rearview mirror.
Figure 8:
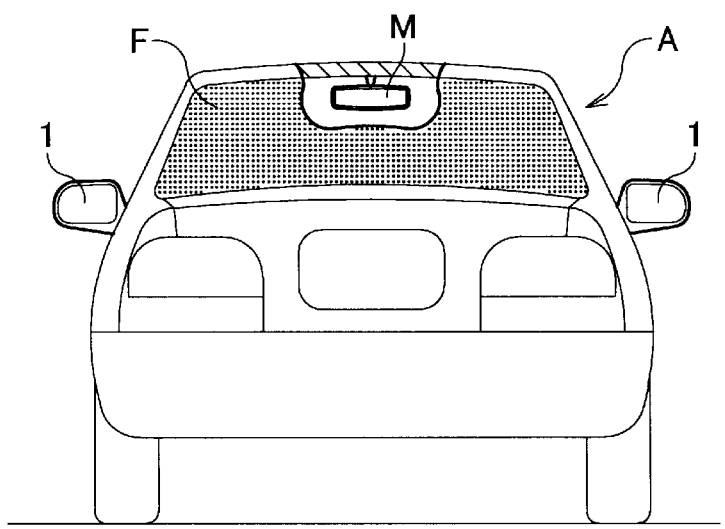
FIG. 8 is a rear elevation for illustrating light-shielding film stuck on a rear window glass of the vehicle body.

To be more specific, an EC antiglare mirror having a conventional structure as shown in FIGS. 7 and 8 is applied to an interior mirror M attached in the vehicle body in such a manner as to operate individually. On the other hand, the exterior mirror 1 having an antiglare function that is attached outside the vehicle body like embodiments of the present invention is configured to allow a driver to perform a remote switching operation behind the wheel of the vehicle, to arbitrarily power up or down. During morning or daytime hours, that is, when surroundings of the vehicle body driven are almost equally lighted in ordinary cases, the exterior mirror 1 is kept in a power-off condition.

In contrast, when a vehicle is driven in a tunnel or during nighttime hours, that is, when a variable combination of light from surroundings of the vehicle body and light irradiated from headlamps of a succeeding car could drastically change intensity of light incident on and reflected off the reflective surface 3a of the mirror assembly 3 constituting the exterior mirror 1, the exterior mirror 1 is turned on and kept in a power-on condition.

In such a power-on condition of the exterior mirror 1, the first and second sensors 8, 9 detect intensity of light from surroundings of the vehicle body and intensity of light from rearward of a succeeding car, and the detected intensity values are compared with each other in the electronic control circuit 10. If the light from rearward is higher than the light from surroundings, an electric current determined according to the difference in intensity is output to the reflective coating 6 to vary reflectance of the reflective coating 6, and thereby the reflectance of the reflective surface 3a of the mirror assembly 3 is controlled by adjusting the electric current. This allows the reflective surface 3a of the mirror assembly 3 to switch from a total reflection condition (non-antiglare condition) to an antiglare condition.

Figure 5:
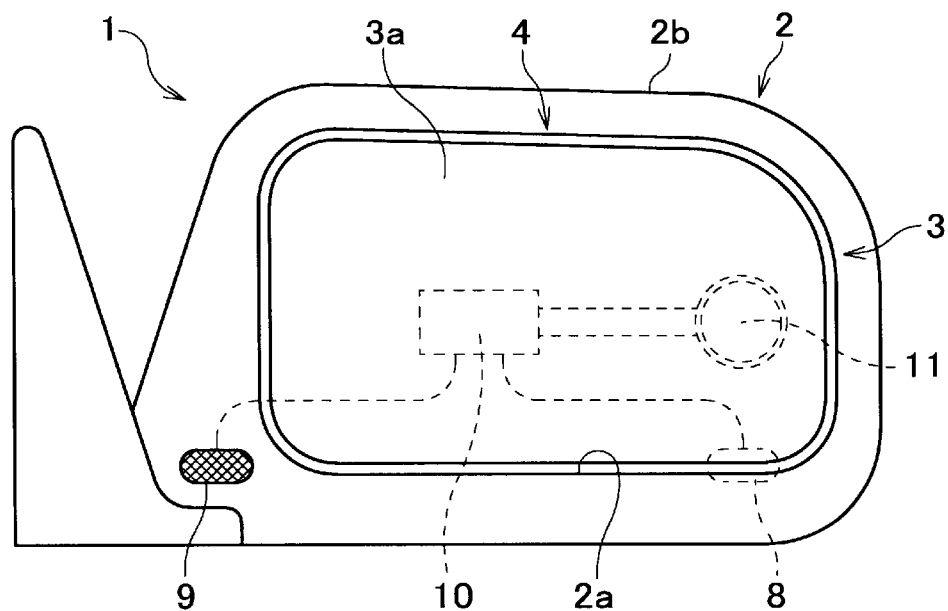
FIG. 5 is an elevation showing a second embodiment of the exterior rearview mirror according to the present invention.
Figure 6:
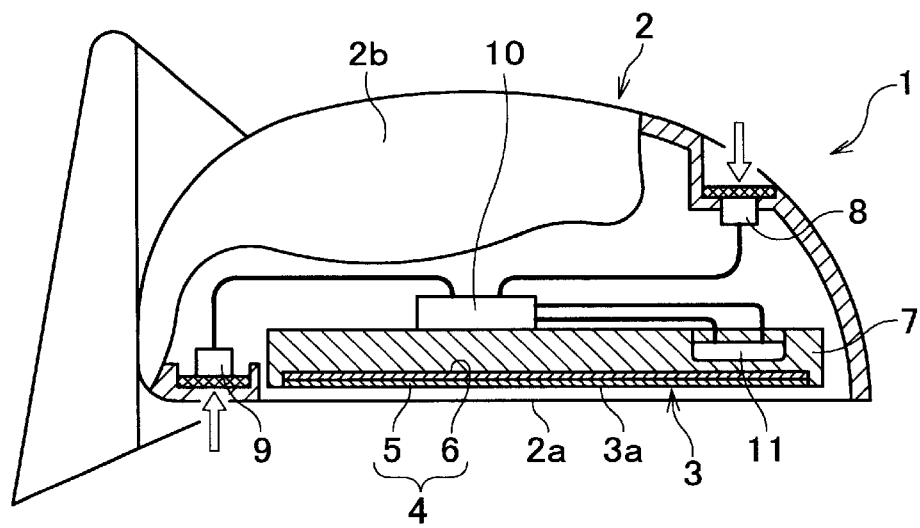
FIG. 6 is a plan view of the exterior rearview mirror as shown in FIG. 5 with a mirror housing partially cutaway.

FIGS. 5 and 6 illustrate a second embodiment of the present invention. In the second embodiment, first and second sensors 8, 9 are located in a mirror housing 2 of an exterior mirror 1; the first sensor 8 is so provided as to face a frame 2b of the mirror housing 2 except an open side 2a thereof from inside, while the second sensor 9 is so provided as to face a corner of the open side 2a of the mirror housing 2 from inside. This construction allows the exterior mirror 1 to detect intensity of light from surroundings and from rearward efficiently and accurately.

As a variation of the second embodiment in which the second sensor 9 for detecting intensity of light from rearward of a vehicle body is provided at the open side 2a, the second sensor 9 may be provided on the mirror assembly 3 side. In this embodiment, as in the first embodiment, an aperture 12 is formed in the reflective coating 6, for example, by cutting out or notching a part thereof corresponding to one lower corner of the mirror 4 of the mirror assembly 3 so that the second sensors 9 provided on the support plate 7 may face the transparent glass plate 5 through the aperture 12.

In the above-discussed embodiments, the exterior mirror (or exterior rearview mirror system) is described and illustrated as a door mirror (i.e., mirror mounted on a door of automobiles or other vehicles), but the scope of the present invention is not limited thereto, and it is to be understood various modifications and changes may be made in the present invention without departing from the spirit and scope thereof.

As described above, the exterior rear view mirror system according to the present invention performs advantageous effects as follows.

One exemplified aspect of the present invention as set forth in claim 1 provides an exterior rear view system that comprehensively incorporates all functions of detecting light from surroundings and rearward of a vehicle body, achieving an antiglare effect, and supplying electric current. Therefore, electric current may be independently controlled to appropriately adjust antiglare levels without coordinating with an EC antiglare interior mirror system as required in the conventional systems. Moreover, a conventionally required complicate task for wiring from a battery provided in the vehicle body may become unnecessary. Further, a dedicated battery provided may supply electric current suitably so that an optimum antiglare effect may be achieved. Furthermore, an antiglare level of the interior mirror never affects an antiglare effect control in the exterior mirror, and thus an optimum antiglare effect may be constantly achieved even if light-shielding film is stuck on rear-window glass of the vehicle body, or a privacy enhanced screen glass window is installed in the vehicle body.

According to another aspect of the present invention as set forth in claim 2, the tasks of replacing an existing non-antiglare mirror system with an antiglare mirror system, or replacing the mirror system upon breakdown or damages may be easily accomplished only by replacing the mirror assembly mounted in the mirror housing. Moreover, this construction, which never requires working the mirror housing, serves to reduce costs.

According to yet another aspect of the present invention as set forth in claim 3, the first sensor may detect intensity of light from surroundings of the vehicle body without affecting light from rearward of the vehicle body with high accuracy and real precision.

According to yet another aspect of the present invention as set forth in claim 4, light from surroundings and light from rearward of the vehicle body never interfere with each other, and thus the first and second sensor may detect intensity of each light with high accuracy and real precision.

According to yet another aspect of the present invention as set forth in claim 5, intensity of light from surroundings and rearward of the vehicle body may be detected with great efficiency and high accuracy.

According to yet another aspect of the present invention as set forth in claim 6, intensity of light from surroundings and rearward of the vehicle body may be detected with great efficiency and high accuracy.

What is claimed is:

1. An exterior rearview mirror system mounted on an outside of a vehicle body, comprising:

a mirror housing; and a mirror assembly that is detachably attached to an open side of the mirror housing, forming a reflective surface of the mirror system, wherein the mirror assembly is composed of a mirror and a support plate for supporting the mirror, which mirror is made up of a transparent glass plate with a reflective coating spread over a back surface of the transparent glass plate, through which reflective coating electric current passes to produce an antiglare effect; and wherein the mirror housing contains:

a first sensor that detects intensity of light from surroundings of the vehicle body;

a second sensor that detects intensity of light from rearward of the vehicle body;

an electronic control circuit that compares the intensity of light detected by the first and second sensors thereby controlling the electric current in the reflective coating so as to automatically adjust an antiglare level; and a battery that is connected with the electronic control circuit to supply the electric current into the reflective coating.

2. An exterior rearview mirror system according to claim 1, wherein the mirror assembly has a modular structure in which the first and second sensors, the electronic control circuit, and the battery are combined into one unit.

3. An exterior rearview mirror system according to claim 1, wherein the mirror assembly has an aperture formed in part of the reflective coating so that the first and second sensors provided adjacent to each other on the support plate face the transparent glass plate through the aperture; and wherein a light-shielding cover that intercepts only light from rearward of the vehicle body is provided on a front surface of the mirror right opposite to the first sensor.

4. An exterior rearview mirror system according to claim 3, wherein a light-shielding plate is interposed between the first sensor and the second sensor.

5. An exterior rearview mirror system according to claim 1, wherein the first sensor is so provided as to face a frame of the mirror housing except the open side thereof; and wherein the second sensor is so provided as to face the open side of the mirror housing.

6. An exterior rearview mirror system according to claim 1, wherein the first sensor is so provided as to face a frame of the mirror housing except the open side thereof; and wherein the second sensor is provided on the support plate of the mirror assembly so that the second sensor faces the transparent glass plate through an aperture formed in part of the reflective coating.

* * * * *